United States Patent
Howarter et al.

(10) Patent No.: US 8,331,221 B2
(45) Date of Patent: Dec. 11, 2012

(54) AUTOMATIC OUTAGE ALERT SYSTEM

(75) Inventors: Jamie Christopher Howarter, Overland Park, KS (US); Charles Michael Lesher, Louisburg, KS (US); Michael C. Robinson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 367 days.

(21) Appl. No.: 12/112,715

(22) Filed: Apr. 30, 2008

(65) Prior Publication Data

US 2009/0274052 A1 Nov. 5, 2009

(51) Int. Cl.
*G01R 31/08* (2006.01)
*G06F 15/173* (2006.01)

(52) U.S. Cl. ........ 370/218; 370/228; 370/244; 370/245; 370/248; 370/252; 709/224

(58) Field of Classification Search .......... 370/216–221, 370/225, 228, 242, 244–245, 248, 250–252; 709/223–224
See application file for complete search history.

(56) References Cited

U.S. PATENT DOCUMENTS

| | | | | |
|---|---|---|---|---|
| 6,000,045 | A * | 12/1999 | Lewis | 714/47 |
| 6,510,212 | B2 * | 1/2003 | Ito et al. | 379/102.03 |
| 6,766,368 | B1 * | 7/2004 | Jakobson et al. | 709/224 |
| 7,111,205 | B1 * | 9/2006 | Jahn et al. | 714/47 |
| 7,249,183 | B1 * | 7/2007 | Subbiah | 709/227 |
| 7,281,170 | B2 * | 10/2007 | Taylor et al. | 714/48 |
| 7,600,159 | B1 * | 10/2009 | Moonier et al. | 714/48 |
| 7,613,106 | B2 * | 11/2009 | Baldwin et al. | 370/218 |
| 7,694,317 | B2 * | 4/2010 | Miyazoe et al. | 725/14 |
| 7,817,982 | B1 * | 10/2010 | Chu et al. | 455/404.1 |
| 7,895,290 | B2 * | 2/2011 | Aureli | 709/217 |
| 2002/0019867 | A1 * | 2/2002 | Pulkkinen | 709/223 |
| 2002/0059412 | A1 * | 5/2002 | Azpitarte | 709/223 |
| 2002/0122394 | A1 * | 9/2002 | Whitmore et al. | 370/328 |
| 2002/0194319 | A1 * | 12/2002 | Ritche | 709/223 |
| 2003/0023722 | A1 * | 1/2003 | Vinberg | 709/224 |
| 2004/0240417 | A1 * | 12/2004 | Kim | 370/338 |
| 2005/0071461 | A1 * | 3/2005 | Mihm et al. | 709/224 |
| 2005/0174229 | A1 * | 8/2005 | Feldkamp et al. | 340/506 |
| 2006/0023676 | A1 * | 2/2006 | Whitmore et al. | 370/338 |
| 2006/0090096 | A1 * | 4/2006 | Guzman et al. | 714/4 |
| 2006/0280207 | A1 * | 12/2006 | Guarini et al. | 370/524 |
| 2007/0282993 | A1 * | 12/2007 | McMillan et al. | 709/223 |
| 2009/0024676 | A1 * | 1/2009 | Boyd et al. | 707/204 |

* cited by examiner

*Primary Examiner* — Michael Thier
*Assistant Examiner* — Redentor Pasia
(74) *Attorney, Agent, or Firm* — Swanson & Bratschun, L.L.C.

(57) ABSTRACT

An outage notification system is provided which includes a first communication network, a second communication network, a plurality of first communication units communicatively coupled to the first communication network and the second communication network, a network monitoring unit communicatively coupled to the first communication network and configured to detect a failure in at least one of the plurality of first communication units or the first communication network, a plurality of second communication units communicatively coupled to the second communication network and associated with corresponding first communication units, and a message alert unit communicatively coupled to the first and second communication networks and configured to receive an alert notification from the network monitoring unit via the first communication network indicating a failure in at least one of the first communication units or the first communication network.

21 Claims, 7 Drawing Sheets

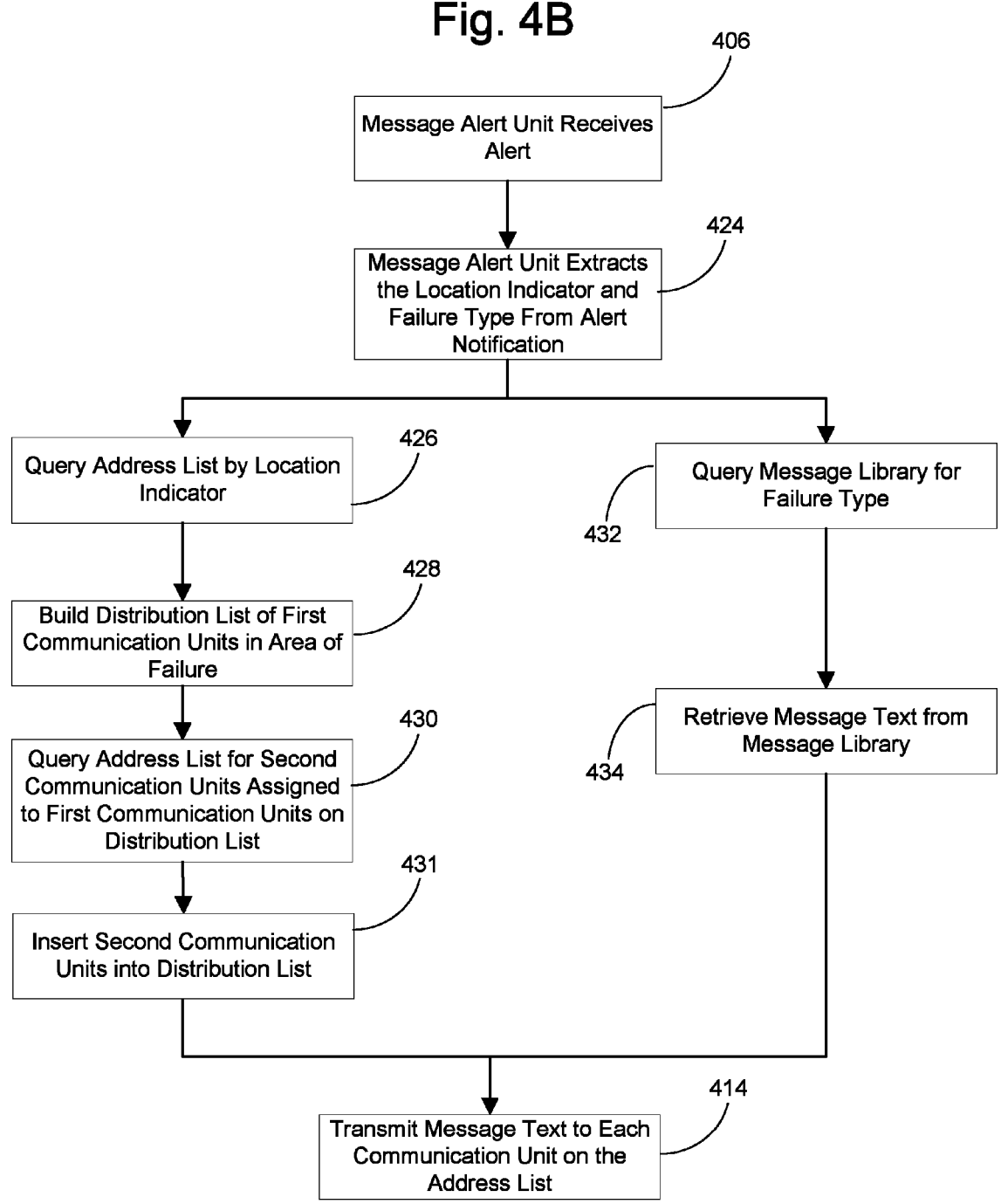

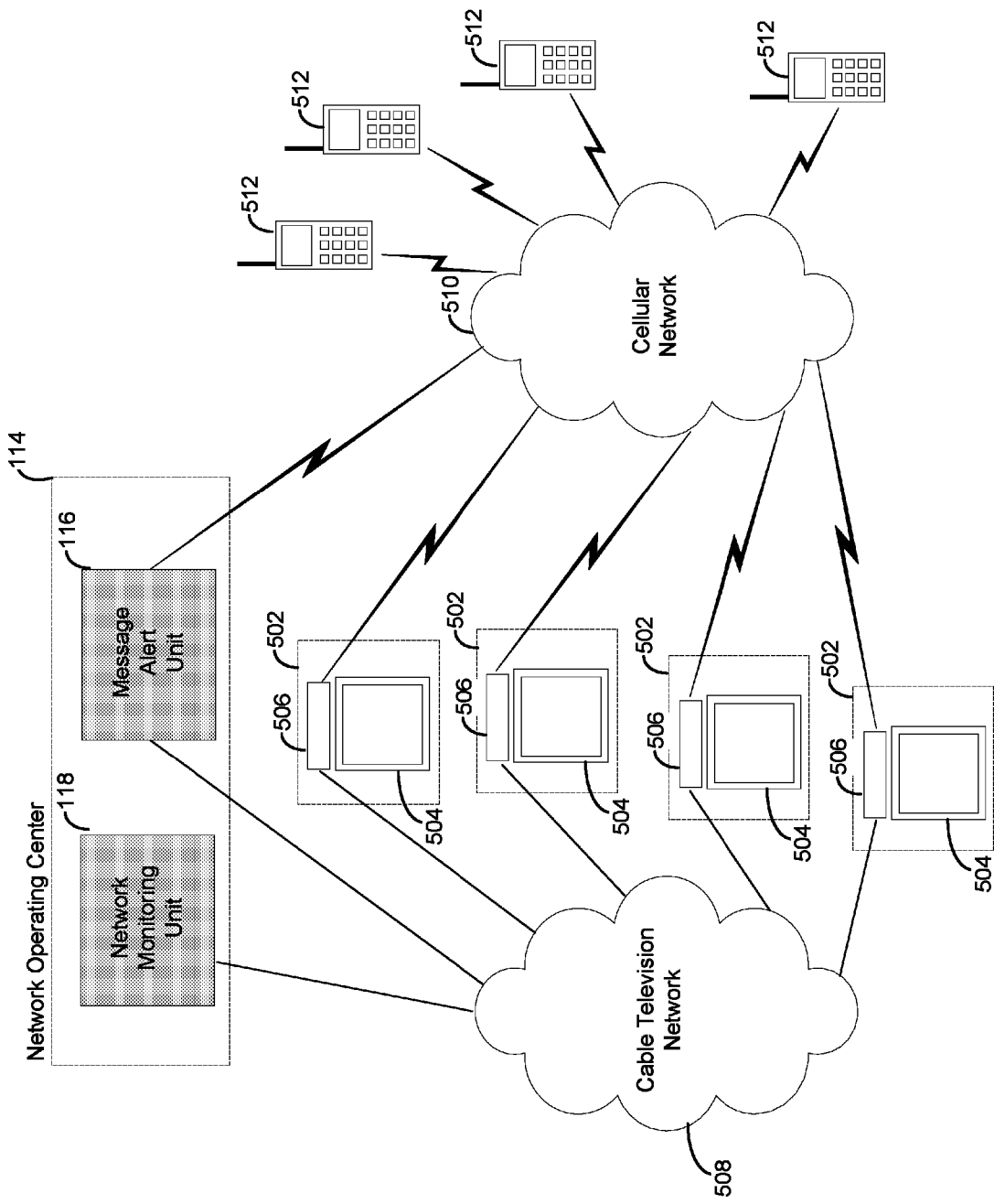

AUTOMATIC OUTAGE ALERT SYSTEM

BACKGROUND OF THE INVENTION

The present invention generally relates to network failure detection and notification and the methods of producing the same. In particular, the invention relates to methods and other accommodations for notifying a network device of an outage.

As technology progresses, customers have more and more interaction with data networks which are used to provide services such as telephone, Internet data and cable television. While the providers of these services have advanced systems for monitoring the health and status of the network, customers currently are not notified of outages in the network. As a result, a consumer will first discover an outage when they attempt to use the service without success.

Once a customer has unsuccessfully attempted to use one of the services provided by the network, they may call a customer service center for the provider of the service to report the outage. If a outage is restricted to the customer's service only, the customer service center will attempt to correct the problem with little impact on the operations of the customer service center. However, for wide spread outages caused by a fault or other failure in the data network, the customer service center may be inundated with hundreds or thousands of phone calls which may result in customers having long hold times or receiving a busy signal when they call. Additionally, the call volume to the service centers during the outage will last for the duration of the outage as more and more customers call the customer service center after unsuccessful attempting to use their service.

SUMMARY OF THE INVENTION

The current invention provides a system and method for notifying the users of a network provided service of a outage in their area.

In one embodiment, an outage notification system includes a first communication network, a second communication network, a plurality of first communication units communicatively coupled to the first communication network and the second communication network, a network monitoring unit communicatively coupled to the first communication network and configured to detect a failure in at least one of the plurality of first communication units or the first communication network, a plurality of second communication units communicatively coupled to the second communication network and associated with corresponding first communication units, and a message alert unit communicatively coupled to the first and second communication networks and configured to receive an alert notification from the network monitoring unit via the first communication network indicating a failure in at least one of the first communication units or the first communication network. Further, the message alert unit is configured to transmit a message via the second communication network to at least one of the first communication units affected by the failure and the associated second communication units.

In another embodiment, the first communication network is a cable television network, a satellite television network, an internet television network, or a computer network. In yet another embodiment, the second communication network is a wireless network or a wireless computer network.

In another embodiment, a plurality of display units are provided which are communicatively coupled to one of the plurality of first communication units and second communication units where each of the first communication units and second communication units provides a message for display to the associated display unit.

In another embodiment, the network monitoring unit determines which of the first communication units and second communication units receive the message.

In another embodiment, the message alert unit determines which of the first communications units and second communication units receive the message.

In another embodiment, the message alert unit sends the message to the first communication units and second communication units as a short message service, an electronic mail message or a simple network protocol message.

In another embodiment, the second communication units are cellular phones or a wireless e-mail communication device.

In another embodiment, a method of notifying a plurality of first communication units and second communication units of a first communication network failure is provided which includes detecting a failure in the one of a plurality of first communication units or the first communication network via a network monitoring unit communicatively coupled to the first communication network. Next, an alert notification is sent from the network monitoring unit to a message alert unit via the first communication network. Once the alert notification is sent, a message stored on the message alert unit based on the alert notification is selected. Next, which of a plurality of first communication units and a plurality of second communication units associated with corresponding first communication units receive the message. The message from the message alert unit is then transmitted via a second communication network to the first communication units and second communication units determined to receive the message.

In another embodiment, the message alert unit is configured to select the message from a plurality of messages stored on the message alert unit based on the type of failure.

In another embodiment, a restoration message is transmitted via the message alert unit after the failure has returned to normal.

Other systems, methods, features, and advantages of the present invention will be or will become apparent to one having ordinary skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 4B depicts a flow diagram of a message distribution list generation process consistent with the present invention

FIG. 5 depicts an illustrative example of a cable television failure notification system consistent with the present invention.

DETAILED DESCRIPTION OF THE PRESENTLY PREFERRED EMBODIMENTS

Figure 1:
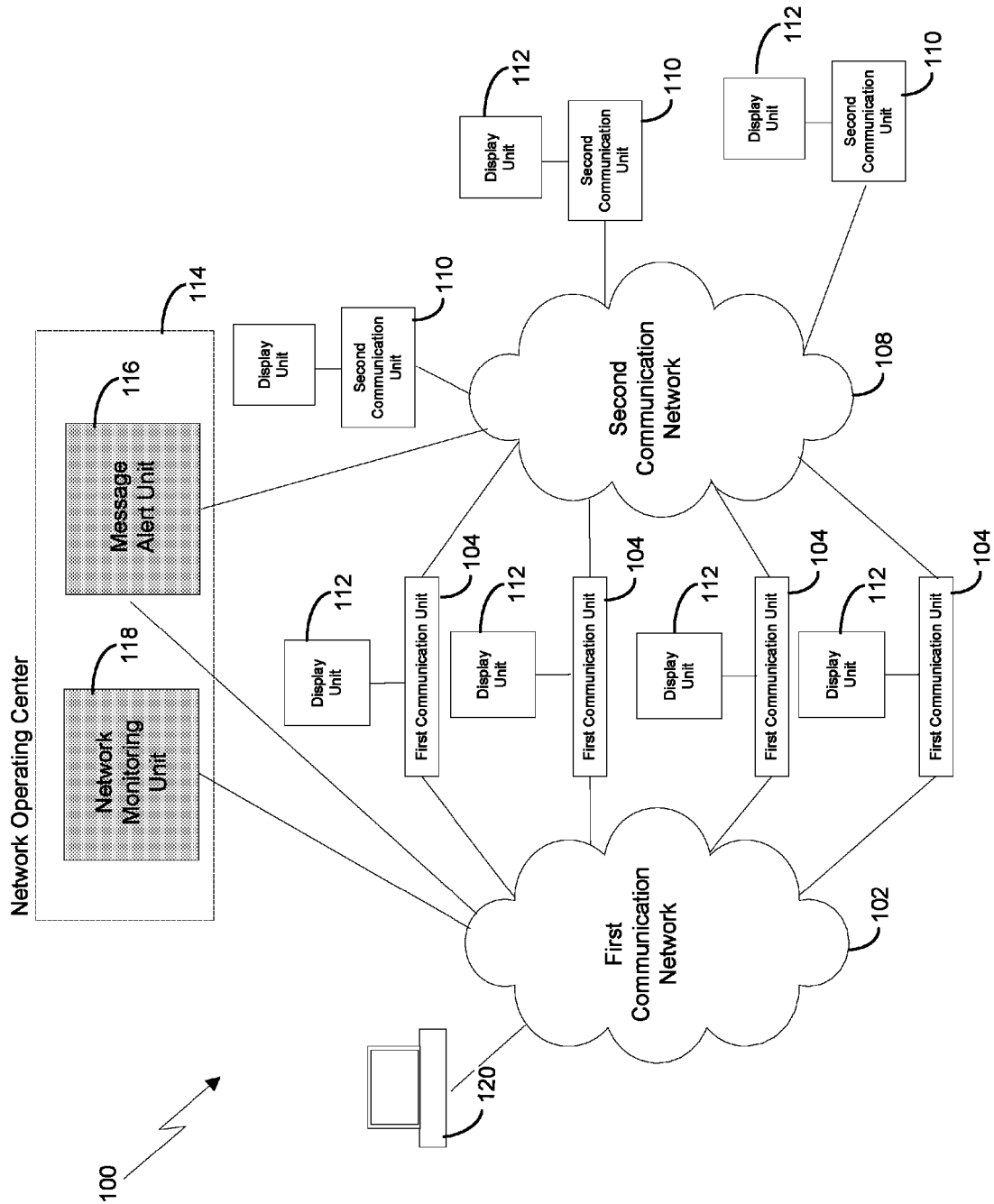
FIG. 1 depicts a schematic diagram of a outage notification system consistent with the present invention.

Referring now to the drawings which depict different embodiments consistent with the present invention, wherever possible, the same reference numbers will be used throughout the drawings and the following description to refer to the same or like parts.

FIG. 1 depicts a schematic diagram of one embodiment of an outage notification system 100 consistent with the present invention. The outage notification system 100 consists of a first communication network 102 communicatively coupled to a plurality of first communication units 104, a second communication network 108 communicatively coupled to a plurality of second communication units 110 and the plurality of first communication units 104, a plurality of display units 112 communicatively coupled to each first and second communication units 104 & 110, a network operations center ("NOC") 114 including a message alert unit 116 communicatively coupled to the first communication network 102 and the second communication network 108 and a network monitoring unit 118 communicatively coupled to the first communication network 102.

The first communication network 102 may be any private or public communication network such as a Local Area Network ("LAN"), Wide Area Network ("WAN"), Peer-to-Peer Network, or the Internet, using standard communication protocols. The first communication network 102 may include hardwired as well as wireless branches.

The first communication network 102 may also be configured as the primary network for the delivery of network services. As an illustrative example, the first network 102, may be a coaxial network delivering cable television to each of the first communication units 104. However, any network service may be delivered to each of the first communication units 104 via the first communication network 102 including, but not limited to, Internet data services, telephony, closed circuit television, digital music, internet television, cable television, satellite television and any other service deliverable via a network. The first communication units 104 may be a set-top cable unit, cable modem, DSL modem, router, switch or any other network device capable of receiving and sending a network signal.

In one embodiment, each of the first communication units 104 is communicatively coupled to the first communication network 102 and the second communication network 108. The second communication network 108 may be configured to deliver messages to each of the first communication units 104. The second communication network 108 may be any known private or public communication network such as a Cellular Network, Local Area Network ("LAN"), Wide Area Network ("WAN"), Peer-to-Peer Network, or the Internet, using standard communication protocols. The second communication network may include hardwired as well as wireless branches. The second communication units 110 may be a cellular phone, a personal data assistant, a laptop computer, a wireless e-mail device or any other device capable of transmitting or receiving data over a network. Each of the second communication units 110 is associated with a corresponding one or more of the first communication units 104.

The network monitoring unit 118 is configured to monitor the performance characteristics of the first communication network 102. The network monitoring unit 118 may use any method of monitoring the status of the first communication network 102 and first communication units 104 including, but not limited to, polling of devices, monitoring network throughput, monitoring network utilization or any other suitable network characteristic indicative of network integrity or network performance. If one of the characteristics of the first communication network 102 falls outside an acceptable range, the network monitoring unit 118 will transmit an alert notification to the message alert unit 116.

Figure 2:
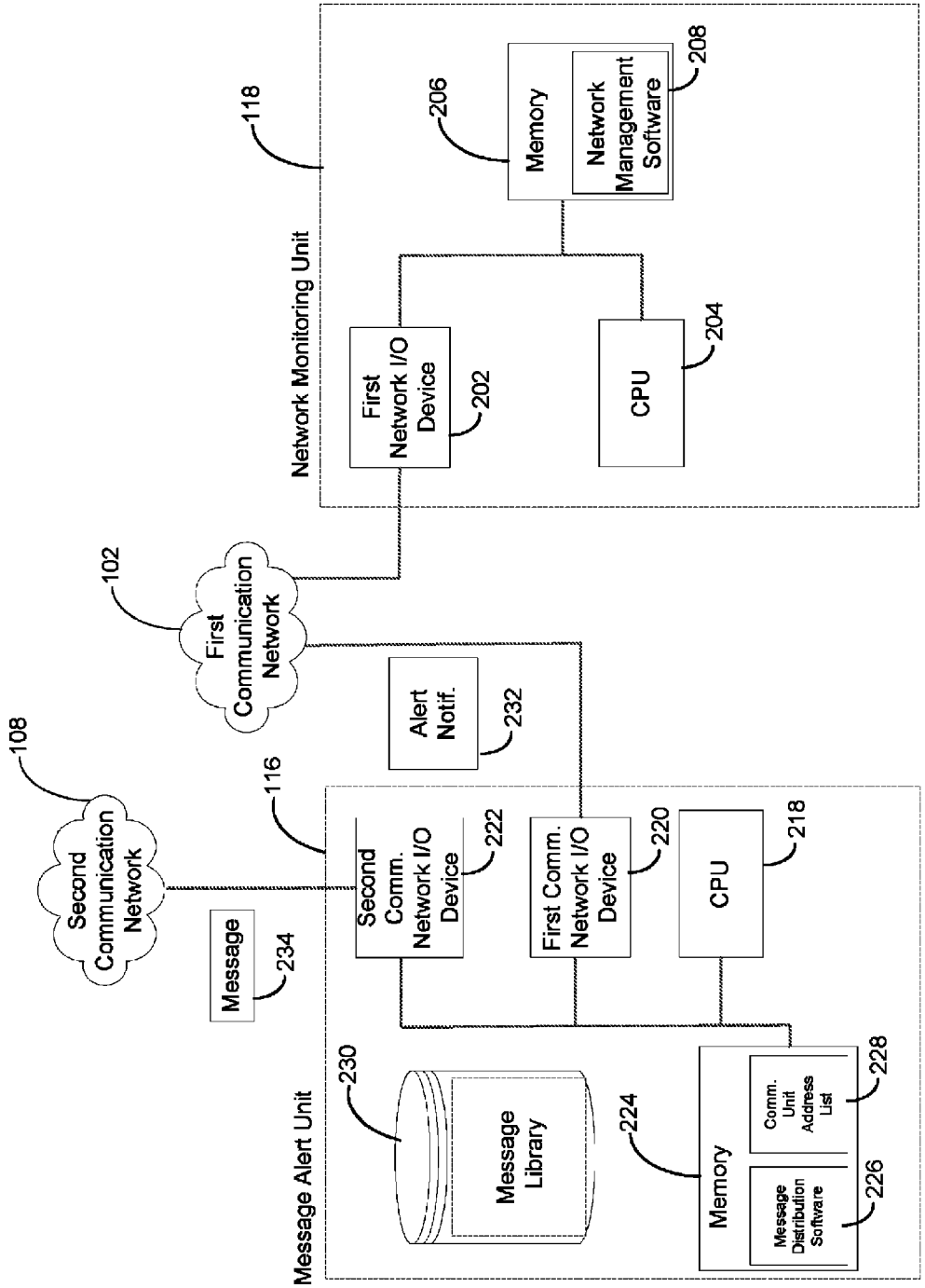
FIG. 2 depicts a schematic representation of an alert message unit and network monitoring unit consistent with the present invention.

FIG. 2 depicts a schematic representation of one embodiment of the message alert unit 116 and network monitoring unit 118. The network monitoring unit 118 includes a first network I/O device 202, a CPU 204, and a memory 206 running network management software 208. The first network I/O device 202 and the network management software 208 of the network monitoring unit 118 are operatively configured to monitor the status of the first communication network 102. The first network I/O device 212 and the network management software 208 are also operatively configured to transmit the alert notifications 216 to the message alert unit 116 via the first communication network 102. The network monitoring unit 118 may transmit the alert notifications 232 to the message alert unit 116 using any acceptable network management protocol, including but not limited to, simple network management protocol ("SNMP"), common management information protocol ("CMIP"), extensible mark up language ("XML") or any other network management protocol.

The message alert unit 116 includes a CPU 218, a first network I/O device 220, a second network I/O device 222, memory 224 running message distribution software 226 and storing communications unit address list 228, and a secondary storage 230 holding a message library. The first network I/O device 220 and message distribution software 226 are operatively configured to receive an alert notification 232 from the network monitoring unit 118. The second network I/O device 222 and message distribution software 226 are operatively configured to transmit messages 234 selected from a message library 230 by the message distribution software 226 via the second communication network 108. The message 234 may be formatted as an XML message, SNMP message, HTML message, Short Message Service message ("SMS") or any other network messaging format.

The message library 230 may contain a plurality of message texts each describing a type of failure that may be encountered in the first communication network 102. Each message text in the library 230 may be indexed by a unique indicator corresponding to the type of failure associated with the message text. The message text for each type of failure may be entered into the message library 230 via a graphical user interface ("GUI") via the computer 120.

The communications unit address list 228 may contain the network addresses of the first and second communication units 104 and 110 on the first communication network 102 indexed by an identifier representing the location of the first communication device 104 on the first communication network 102, including but not limited to a network location or a geographic location. The communications unit address list 228 may also contain a list, indexed by its associated first communication device 104, of second communication units 110 associated with each first communication units 104.

The alert notification 232 may include such information that the message alert unit 116 can select the appropriate message 234 from the message library 230 and also determine the list of first and second communication units 104 and 110 from the communication unit address list 228 that will receive the message 234. For example, the alert notification may indicate the type of failure experienced in the network and an indicator identifying the general location on the network where the failure is occurring.

In another embodiment the network monitoring unit 118 may utilize the network management software 208 to determine the first and second communication units 104 to be added the distribution list. If the network monitoring unit 118 utilizes the network management software 208 to determine the distribution list, the list will be included as part of the alert notification 216 sent from the network monitoring unit 206. The network monitoring unit 118 may utilize the message distribution software 226 to send the message to the first and second communication units 104 and 110 listed in the distribution list received by the network monitoring unit 206.

In another embodiment, the alert notification is sent to the alarm message unit 116 manually from a computer 120 on the first communication network 102. An illustrative example consistent with this embodiment, may include a service worker at a remote location working on a segment which must shut for maintenance. The user, via a computer 120 located on the first network, may send out an alert notification 232 directly to the message alert unit 116 which will in turn transmit an alert message 234 via the second communication network 108 to the first and second communication units 104 and 110.

Another illustrative example consistent with this embodiment may include a customer service representative of the service provider who receives multiple calls indicating a outage in the first communication network 102. The customer service representative may send an alert notification 232 directly to the message alert unit 116 which will in turn transmit an alert message 234 via the second communication network 108 to the first and second communication units 104 and 110.

Figure 3A:
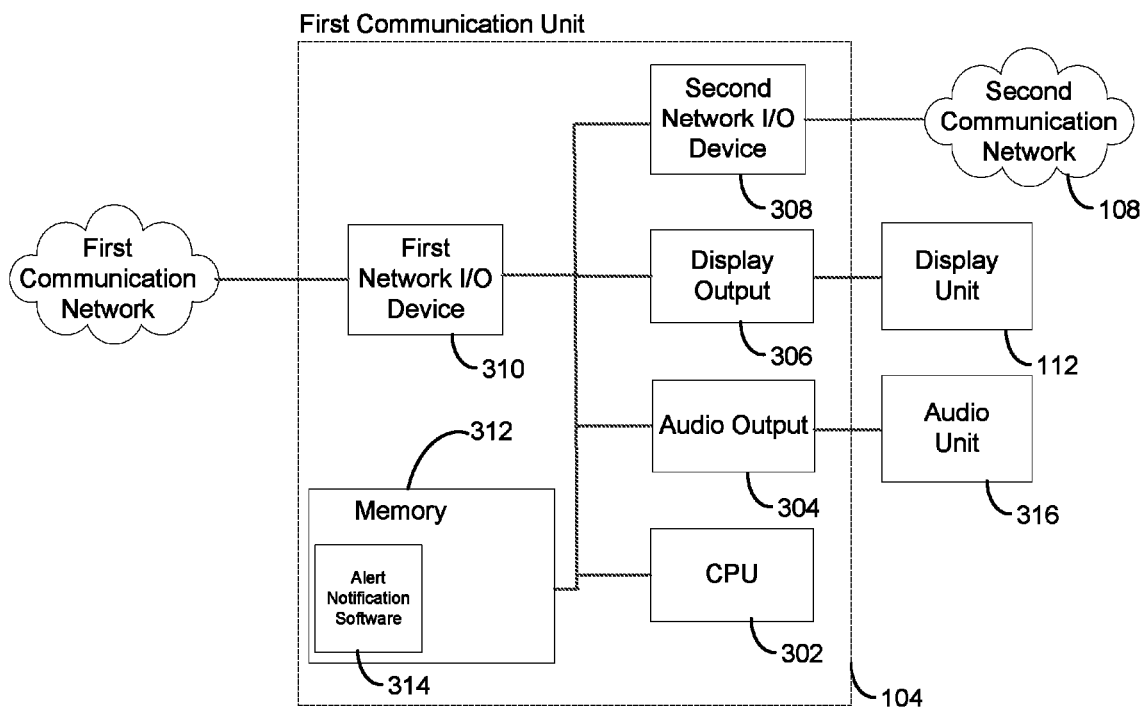
FIGS. 3A and 3B depict schematics of a first communication unit and second communication unit consistent with the present invention.

FIG. 3A depicts a schematic of an embodiment of one of the first communication units 104 consistent with the present invention. The first communication unit 104 consists of a CPU 302, an audio output 304, a display output 306, a second network I/O device 308, a first network I/O device 310, a memory 312 running alert notification software 314, a display unit 112 communicatively coupled to the display output 306, and a optional audio unit 316 communicatively coupled to the audio output 304. The first network I/O device 310 is operatively configured to receive desired service signals such as cable television, internet data, internet television and any other network deliverable service and provide the service signals to the display output 306. The second network I/O device 308 is operatively configured to receive messages via the second network 108.

The alert notification software 314 is operatively configured to receive the message 234 from the second network I/O device 308 and provide the message 234 to the display output 306. The display output 306 is operatively configured to provide the display unit 112 with the message 234 in a presentable format. The optional audio output 304 is operatively configured to provide an audible message or tone to the audio unit 316.

Figure 3B:
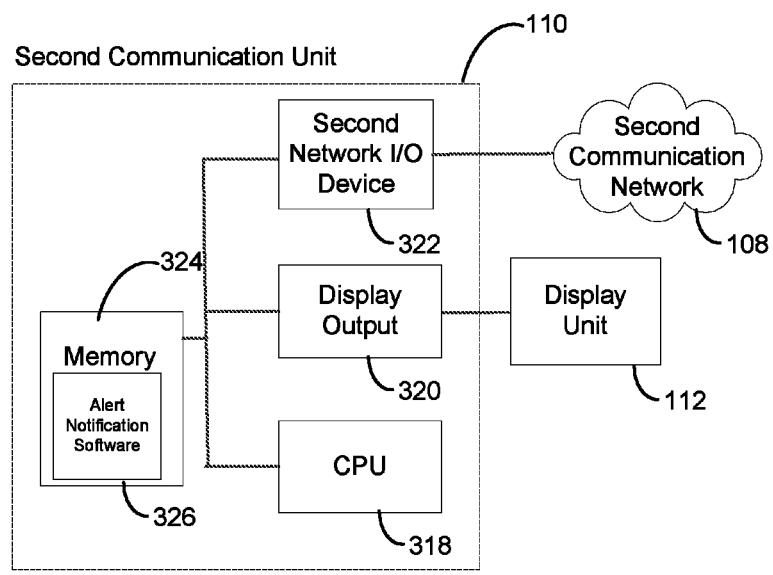

FIG. 3B depicts an embodiment of one of the secondary communication units 110 which consists of a CPU 318, a display output 320, a second network I/O device 322, a memory 324 running message notification software 326, and a display unit 112 communicatively coupled to the display output 306. The second network I/O device 322 is operatively configured to receive messages 234 via the second network 108 and provide the message 234 to the message notification software 326. The message notification software 326 is operatively configured to receive the message 234 from the second network I/O device 322 and provide the message 234 to the display output 306. The display output 306 is operatively configured to provide the display unit 112 with the message 234 in a presentable format. Presentable formats for display on the second communication units 110 may include XML, HTML, SMS and any other messaging protocol which for displaying text on a network device.

Figure 4A:
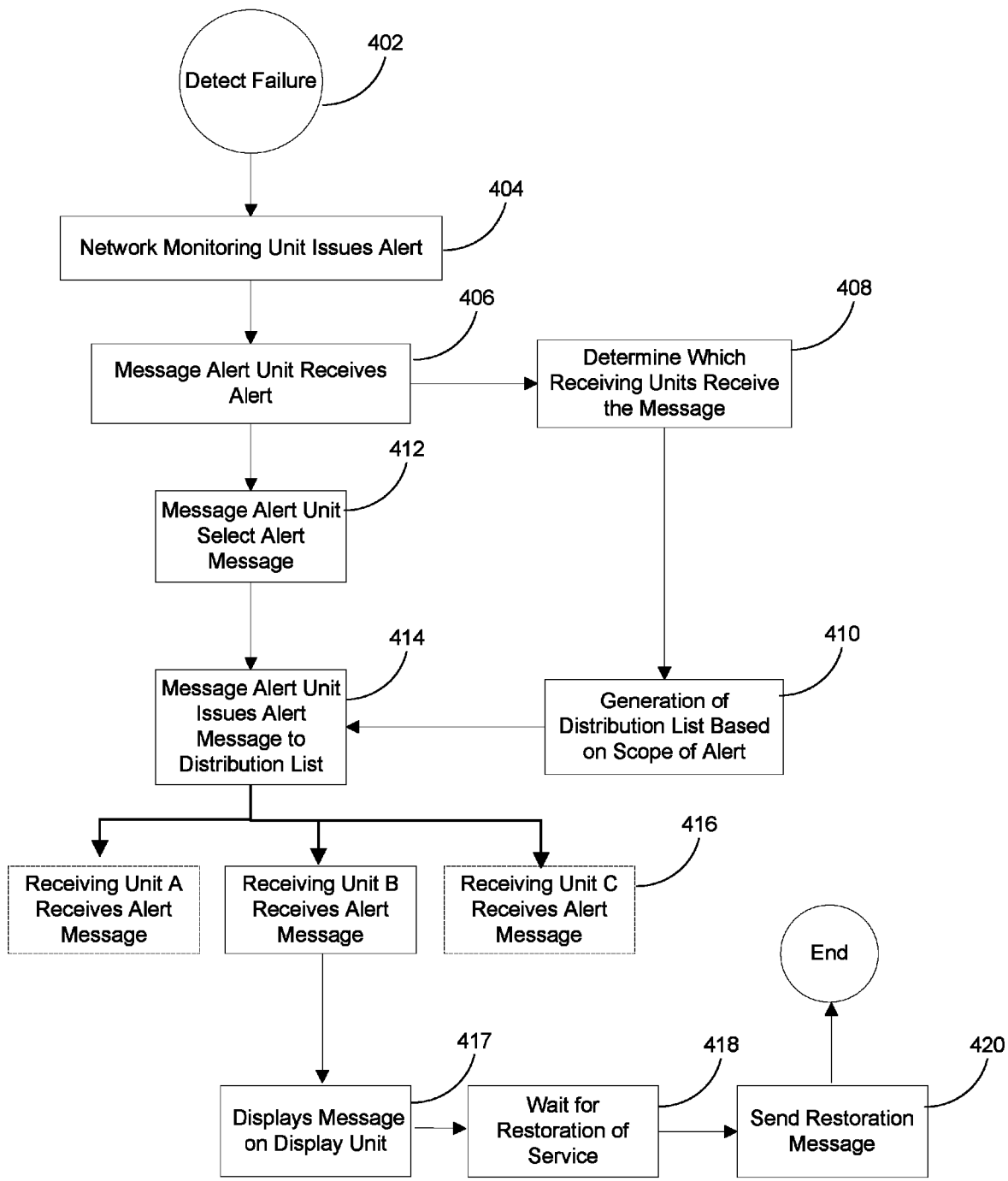
FIG. 4A depicts a flow diagram of a secondary notification process consistent with the present invention.

FIG. 4A depicts an embodiment of a flow diagram of a secondary notification process consistent with the present invention. Initially, the network management software 208 running on the network monitoring unit 118 detects a failure in the first communication network 102 or in one or more of the first communication units 104 (Step 402). Upon detection of the failure, the network monitoring unit 118 sends an alert notification 232 over the first communication network 102 via the first network I/O device 202 located in the network monitoring unit 118 (Step 404). The first network I/O device 220 in the message alert unit 116 receives the alert notification 232 (Step 406).

After receiving the alert notification 232, the message alert unit 116 utilizes the message distribution software 226 to determine which of the first communication units 104 and second communication units 110 should receive the message 234 via the second network 108 (Step 408). The message alert unit 116 then uses the message distribution software 226 to compile a distribution list of network addresses (based information obtained from the network or network devices such as network location, connection path, IP address, etc) of the first communication units 104 and second communication units 110 which will receive the message 232 via the second communication network 108 (Step 410). Simultaneously, the message alert unit 116 uses the message distribution software to select the message text for the message 234 based on the type of alert indicated in the alert notification 232 (Step 412).

Once the message text is selected, the message alert unit 116 utilizes the message distribution software 226 to transmit the message text in the message 234 over the second communication network 108 via the second network I/O device 222 in the message alert unit 116 to the first communication units 104 and second communication units 110 listed in the distribution list (Step 414). The message 234 is received by the first communication unit 104 over the second communication network 108 via the second network I/O device 308 located in the first communication unit 104 (Step 416). The message is also received by the second communication units 110 via the second network I/O device 322 (Step 416).

Once the message 234 is sent, the message alert unit 116 continues to monitor the first communication network 102 until the failure returns to normal (Step 418). After the failure has returned to normal, the message alert unit 116 transmits a restoration message over the first communication network 102 and the second communication network 108 to the first communication units 104 and second communication units 110 (Step 420). The first communication units 104 and second communication units 110 then provide the received restoration message to the display units 112.

FIG. 4B depicts an embodiment of a flow diagram of a message distribution list generation process consistent with the present invention. Initially, the message alert unit 116 receives the alert notification from the network monitoring unit 118 via the first communication network 102 (Step 422). The message alert unit 116 extracts a location indicator and a failure indicator from the alert notification (Step 424). The message alert unit 116 utilizes the message distribution software 226 to query the communications unit address list 228 for first communication units 104 affected by the failure (Step 426). The results of the query are stored on the alert messaging unit 116 as a distribution list (Step 428). Next, the message alert unit 116 utilizes the message distribution software 226 to query the communications unit address list 228 for second communication units 110 assigned to the first communication units in the distribution list (Step 430). The message alert unit 116 then inserts the results of the query into the distribution list (Step 431).

Parallel to the querying of the communications unit address list 228, the alert messaging unit 116 utilizes the message distribution software 226 to query the message library 230 for the message text corresponding to the type of failure received in the alert notification 232 (Step 432). Once the message text is selected and the distribution list is complete, the alert message unit 116 transmits the message text in the message 234 to the first communication units 104 and second communication units 110 on the distribution list (Step 414).

Figure 4C:
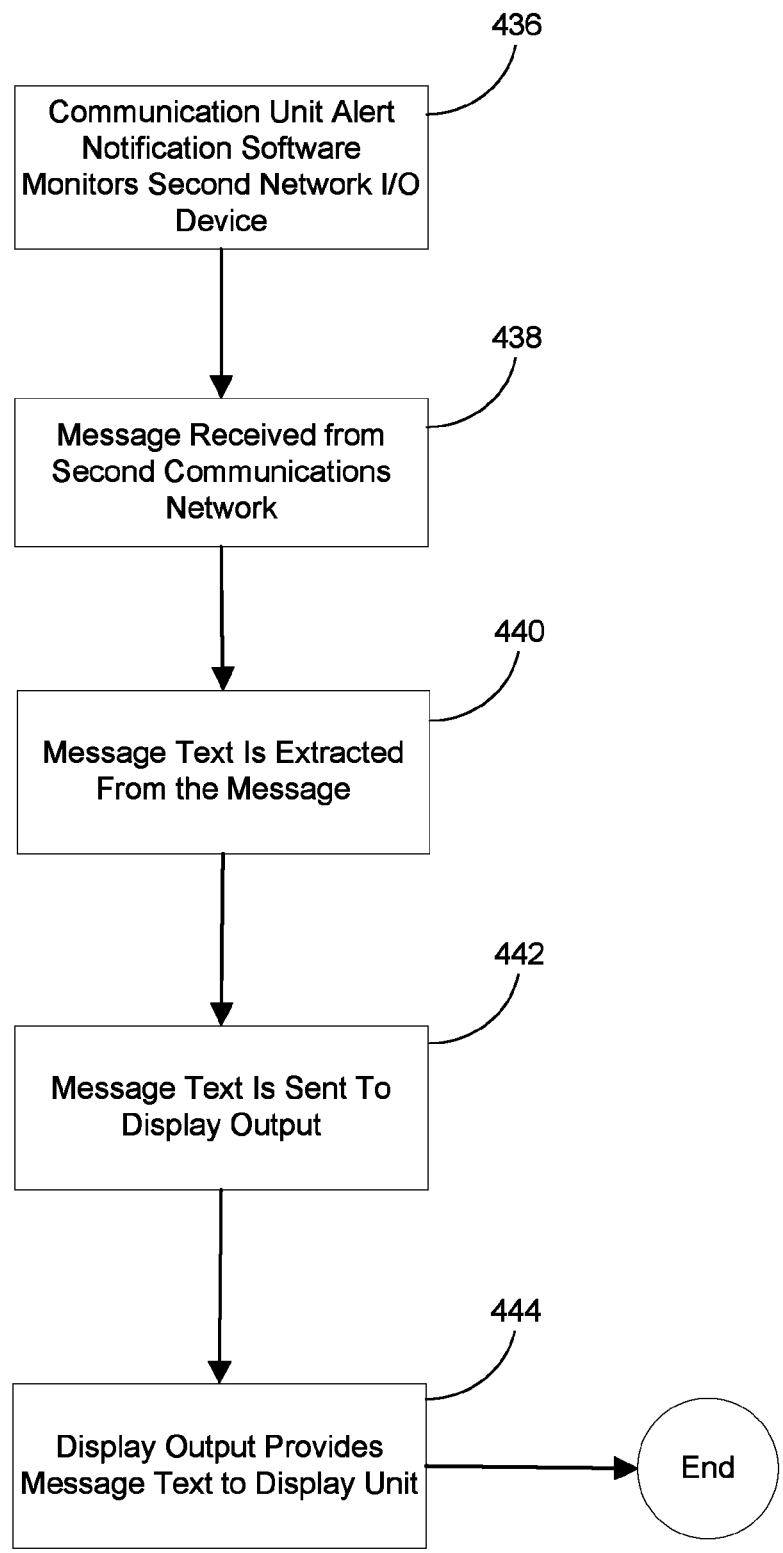
FIG. 4C depicts a flow diagram of a communication unit message display process consistent with the present invention.

FIG. 4C depicts a flow diagram of a communication unit message display process consistent with the present invention. Initially, the communication unit 104 and 110 utilizes the alert notification software 314 and 326 to monitor the second network I/O device 308 and 322 for a message 234 (Step 436). When a message 234 is received on the second network I/O device 308 and 322, the message text is extracted by the communication unit 104 and 110 via the alert notification software 314 and 326 (Steps 438 and 440). After the message text is extracted from the message 234, the communication device 104 and 110 utilizes the alert notification software 314 and 326 to deliver the message text to the display output 306 (Step 442). The display unit then provides the message text to the display unit 112 (Step 444) where it is displayed on the display unit 112.

FIG. 5 is an illustrative example of a failure detection system for a cable television network 508 consistent with the current invention including a coaxial cable network providing cable television to a customer's house. Each house 502 contains a television 504 and a set-top cable unit 506. The set-top cable unit 506 contains a cable television network connection for connection to the cable television network 508 and a cellular modem for connection to a cellular network 510. Cable television programs are provided to the set-top unit 506 via the cable television network 508. A network monitoring unit 118, located in a NOC 114, is connected to the cable television network 508 and monitors the performance and status of the cable television network 508 and the set-top units 506.

When a failure is detected in the cable television network 508 or in at least one of the set-top units 506, the network monitoring unit 118 transmits an alert notification to a message alert unit 116, located in the NOC 114, connected to the cable television network 508. The alert notification includes information pertaining to the location of the failure on the network and the type of failure occurring. The message alert unit 116 determines which set-top units 506 are affected by the failure as well as any second communication units 512, such as cellular phones, that are associated with the set-top units 506 affected by the outage and require notification. The message alert unit 116 generates a distribution list for the failure and then transmits a message to the affected set-top units 506 and second communication units 512 via the cellular network 510. The message includes text which indicates that a failure has occurred and includes information pertaining to the extent and type of failure.

When the set-top unit 506 receives the message, the set-top unit displays the message on the television 504. Since the customer is notified of the outage and is given information pertaining to the outage, they will not call a customer service line thereby reducing the call intake of the customer service center during a failure. In addition, if the customer or service provider has pre-selected a second communication unit to be notified of an outage, the second communication units 512 will display the outage message on the second communication unit 512. When the failure has ended and normal operations are resumed, a restoration message is sent from the message alert unit 116 to the set-top unit 506 informing the customer that the problem is corrected and that service will be returning shortly.

By providing a first and second network which operate separately it is possible to notify users of network outages while the outage is occurring and before they call a provider's customer service department. This results in lower calls to the customer service department and increased customer satisfaction. Additionally, because the two networks are separate, a failure on the first communication network does not effect the operation of the second communication network. Accordingly, the system offers redundancy for notification of network outages.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. An outage notification system comprising:
a first communication network communicatively coupling a plurality of first communication units;
a second communication network communicatively coupling a plurality of second communication units;
a network monitoring unit communicatively coupled to the first communication network and configured to detect a failure in at least one of the plurality of first communication units or the first communication network;
the plurality of second communication units communicatively coupled to the second communication network and operable to communicate with the first communication network only through the second communication network, wherein each of the second communication units is associated with a corresponding one or more of the first communication units, the plurality of first communication units is of a first type of device and the plurality of second communication units is of a second type of device, the first type and the second type being different; and
a message alert unit communicatively coupled to the first communication network and the second communication network, the message alert unit configured to receive an alert notification from the network monitoring unit via the first communication network indicating a failure in at least one of the first communication units or the first communication network, the alert notification to the message alert unit from the network monitoring unit includes an indicator of a type of failure and a general location on the first communication network where the failure is occurring in response to detecting that the failure is occurring within the first communication network, wherein, the message alert unit is configured to extract a location indicator and a failure type from the alert notification, querying a communications address list for first communications units affected by the failure, store the results of the communications address list query as a distribution list, perform a second query of the communications address list for second communications units assigned to the first communication units in the distribution list, insert the results of the second communications address list query into the distribution list and transmit a message via the second communication network without traversing the first network to the second communication units associated with at least one of the first communication units included on the distribution list, wherein the network monitoring unit and message alert unit are both located within a network operation center, while the plurality of first communication units and the plurality of second communication units are located outside the network operation center.

2. The outage notification system of claim 1, wherein the first communication network is a cable television network or a satellite television network.

3. The outage notification system of claim 1, wherein each of the first communication units is further communicatively coupled to the second communication network.

4. The outage notification system of claim 1, wherein the second communication network is a wireless computer network or a wireless cellular network.

5. The outage notification system of claim 1, further comprising:
a plurality of display units each communicatively coupled to the plurality of second communication units, wherein, each of the second communication units provides the message to the associated display unit.

6. The outage notification system of claim 1, wherein the network monitoring unit determines which of the plurality of second communication units receives the message.

7. The outage notification system of claim 1, wherein the message alert unit determines which of the plurality of second communication units receives the message.

8. The outage notification system of claim 1, wherein the message alert unit sends the message to the second communication units as a short message service.

9. The outage notification system of claim 1, wherein the alert notification is manually sent to the message alert unit via the first network.

10. The outage notification system of claim 1, wherein each of the second communication units are a cellular phone or a wireless e-mail communication device.

11. A method of notifying a plurality of first communication units and second communication units of a communication failure comprising the steps of:
detecting a failure in the one of a plurality of first communication units or a first communication network providing service to the plurality of first communication units via a network monitoring unit communicatively coupled to the first communication network;
sending an alert notification from the network monitoring unit to a message alert unit via the first communication network;
extracting a location indicator and a failure type from the alert notification at the message alert unit;
querying a communications address list for first communications units affected by the failure;
storing the results of the communications address list query as a distribution list;
performing a second query of the communications address list for second communications units assigned to the first communication units in the distribution list;
inserting the results of the second communications address list query into the distribution list;
selecting a message stored on the message alert unit based on the alert notification; and
transmitting the message from the message alert unit via a second communication network to the first communication units and the second communication included on the distribution list;
wherein the network monitoring unit and message alert unit are both located within a network operation center, while the plurality of first communication units and the plurality of second communication units are located outside the network operation center.

12. The method of claim 11, wherein, the message alert unit is configured to select the message from a plurality of messages stored on the message alert unit based on the type of failure.

13. The method of claim 11, further comprising the steps of:
transmitting a restoration message via the message alert unit over one of the first communication network and second communication network after the failure is corrected.

14. The method of claim 11, wherein, the first communication network is a cable television network, a satellite television network, an internet television network or a computer network.

15. The method of claim 11, wherein, the second communication network is a wireless computer network or a wireless cellular network.

16. The method of claim 11, further comprising the steps of:
providing the message to a display unit communicatively coupled to each of the first communication units and second communication units.

17. The method of claim 11, wherein the network monitoring unit determines which of the plurality of first communication units and second communication units receives the message.

18. The method of claim 11, wherein the message alert unit determines which of the plurality of first communication units and second communication units receives the message.

19. The method of claim 11, wherein the message alert unit transmits the message to the first communication units and second communication units as a short message service, an electronic mail message or a simple network message protocol message.

20. The method of claim 11, wherein the alert notification is manually transmitted to the message alert unit via the first communication network.

21. The method of claim 11, wherein the second communication unit is a cellular phone or a wireless e-mail communication device.

* * * * *